United States Patent
Qiu et al.

(10) Patent No.: US 8,848,893 B2
(45) Date of Patent: Sep. 30, 2014

(54) METHOD AND APPARATUS FOR CALLBACK PROCESSING IN TELECOMMUNICATION CAPABILITY OPENING

(71) Applicant: Huawei Technologies Co., Ltd., Shenzhen (CN)

(72) Inventors: Zhihong Qiu, Shenzhen (CN); Youliang Yan, Shenzhen (CN); Wangbin Zhu, Shenzhen (CN); Hongbo Jin, Shenzhen (CN); Wenyang Zang, Beijing (CN)

(73) Assignee: Huawei Technologies Co, Ltd., Shenzhen (CN)

( * ) Notice: Subject to any disclaimer, the term of this patent is extended or adjusted under 35 U.S.C. 154(b) by 0 days.

(21) Appl. No.: 13/870,673

(22) Filed: Apr. 25, 2013

(65) Prior Publication Data
US 2013/0236000 A1 Sep. 12, 2013

Related U.S. Application Data

(63) Continuation of application No. PCT/CN2011/074164, filed on May 17, 2011.

(30) Foreign Application Priority Data

Oct. 25, 2010 (CN) .......................... 2010 1 0518890

(51) Int. Cl.
| | | |
|---|---|---|
| H04M 3/42 | (2006.01) | |
| H04M 3/48 | (2006.01) | |
| H04L 29/06 | (2006.01) | |
| H04M 3/51 | (2006.01) | |
| G06F 9/54 | (2006.01) | |
| H04M 3/432 | (2006.01) | |

(52) U.S. Cl.
CPC ......... *H04M 3/5191* (2013.01); *H04L 65/1069* (2013.01); *G06F 9/54* (2013.01); *H04L 65/4061* (2013.01)

USPC .................... 379/210.01; 455/414.1

(58) Field of Classification Search
CPC ..... H04M 3/42; H04M 3/42195; H04M 3/48; H04M 3/5231
USPC ....... 379/209.01, 210.01; 455/414.1
See application file for complete search history.

(56) References Cited

U.S. PATENT DOCUMENTS

| | | | |
|---|---|---|---|
| 6,604,136 B1 * | 8/2003 | Chang et al. .................. | 709/223 |
| 2003/0018692 A1 | 1/2003 | Ebling et al. | |
| 2005/0125808 A1 * | 6/2005 | Izurieta ......................... | 719/318 |
| 2005/0273787 A1 * | 12/2005 | Kovachka-Dimitrova et al. ............................. | 719/310 |
| 2009/0298465 A1 * | 12/2009 | Choi et al. .................... | 455/406 |
| 2009/0313603 A1 | 12/2009 | Tendler et al. | |
| 2011/0176670 A1 * | 7/2011 | Kaplan et al. ............ | 379/210.01 |

FOREIGN PATENT DOCUMENTS

| | | |
|---|---|---|
| CN | 101196813 A | 6/2008 |
| CN | 101291335 A | 10/2008 |
| CN | 101730322 A | 6/2010 |
| CN | 101969469 A | 2/2011 |
| WO | 2004006486 A2 | 1/2004 |
| WO | 2006048207 A1 | 5/2006 |

OTHER PUBLICATIONS

Foreign Communication From a Counterpart Application, Chinese Application No. 201010518890.7, Chinese Search Report dated May 17, 2012, 2 pages.

Foreign Communication From a Counterpart Application, PCT Application No. PCT/CN2011/074164, English Translation of Chinese Search Report dated Aug. 18, 2011, 4 pages.

Foreign Communication From a Counterpart Application, PCT Application No. PCT/CN2011/074164, English Translation of Written Opinion dated Aug. 18, 2011, 4 pages.

Foreign Communication From a Counterpart Application, Chinese Application No. 2010518890.7, Chinese Office Action dated May 2, 2013, 4 pages.

Foreign Communication From a Counterpart Application, Chinese Application No. 201010518890.7, Partial English Translation of Chinese Office Action dated May 2, 2013, 6 pages.

Kan, Z., "Design and Implementation of wIMS Middleware Platform Based on REST in IMS," Telecom Engineering Technics and Standardization, Jul. 16, 2010, 6 pages.

Kan, Z., "Design and Implenmentation of wIMS Middleware Platform Based on REST in IMS," Telecom Engineering Technics and Standardization, Partial English Translation, Jul. 16, 2010, 6 pages.

Qingguo, S., et al., "Survey on Server—Push Technology of Web Applications," Computer Systems & Applications, Issue 11, Nov. 30, 2008, pp. 116-120.

Qingguo, S., et al., "Survey on Server—Push Technology of Web Applications," Computer Systems & Applications, Issue 11, Nov. 30, 2008, Partial English Translation, 1 page.

Foreign Communication From a Counterpart Application, PCT Application PCT/CN2011/074164, Chinese Search Report dated on Aug. 18, 2011, 4 pages.

Foreign Communication From a Counterpart Application, European Application No. 11777196.4, Extended European Search Report dated Oct. 28, 2013, 6 pages.

\* cited by examiner

*Primary Examiner* — Harry S Hong

(74) *Attorney, Agent, or Firm* — Conley Rose, P.C.; Grant Rodolph; Nicholas K. Beaulieu

(57) ABSTRACT

A method for callback processing in telecommunication capability opening, a telecommunication capability opening server, a client, and a telecommunication capability opening service system are disclosed. The method includes: receiving a telecommunication capability application programming interface (API) call request sent by a client, where the telecommunication capability API call request includes a callback information parameter; performing callback processing according to the telecommunication capability API call request, and generating a callback message according to the callback information parameter; and pushing the callback message to the client. The method may also include: initiating a telecommunication capability API call request to a telecommunication capability opening server, where the telecommunication capability API call request includes a callback information parameter; receiving a callback message pushed by the telecommunication capability opening server, and parsing the callback message; and determining, according to a parsing result, a function that callback processing needs, and calling the function.

16 Claims, 6 Drawing Sheets

METHOD AND APPARATUS FOR CALLBACK PROCESSING IN TELECOMMUNICATION CAPABILITY OPENING

CROSS-REFERENCE TO RELATED APPLICATIONS

This application is a continuation of International Application No. PCT/CN2011/074164, filed on May 17, 2011, which claims priority to Chinese Patent Application No. 201010518890.7, filed on Oct. 25, 2010, all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communication technologies, and in particular, to a method and an apparatus for callback processing in telecommunication capability opening.

BACKGROUND

Web-based telecommunication capability is a critical technology in the integration between a telecommunication network and the traditional Internet and also a critical technology on the mobile Internet. The Web technology is a typical technology on the traditional Internet and is represented by the following three forms: hypertext, hypermedia, and Hyper-Text Transfer Protocol (HTTP). The Web technology serves as a basis for website technologies and webpage technologies on the traditional Internet. The Web-based telecommunication capability means that telecommunication capability is open to the traditional Internet in the form of an application programming interface (API), so that applications on the traditional Internet can call the telecommunication capability in Internet mode to form new applications.

The Web-based telecommunication capability in the prior art focuses on a mode oriented to a service provider (SP) server. In this mode, the telecommunication capability API is open to the SP; after the SP signs an agreement with a telecommunication operator, the SP server may call the telecommunication capability API provided by a telecommunication capability opening server; the telecommunication capability opening server and the SP server establish communication by calling interfaces of each other.

However, during the implementation of the present invention, the inventor discovers that the current Web-based telecommunication capability oriented to the SP server is not applicable to free developers directly; and a callback technology in telecommunication capability opening is a main technology difficulty in achieving the Web-based telecommunication capability oriented to free developers. The callback in telecommunication capability opening means that when the SP server calls a telecommunication capability API of the telecommunication capability opening server, a Web service address of the SP server is used as a parameter sent to the telecommunication capability opening server. The telecommunication capability opening server, when necessary, calls a callback interface of the SP server by using the Web service address. At this time, the called callback interface of the SP server implements message processing or a particular operation. For example, when the SP server calls a telephony API of the telecommunication capability opening server, the telecommunication capability opening server needs to provide the SP server with corresponding messages when the terminating party is busy, or the terminating party is connected or the terminating party does not answer, so that the SP server performs corresponding processing. In another example, when the SP server calls a short messaging API of the telecommunication capability opening server, the telecommunication capability opening server needs to provide the SP server with a corresponding message when a short message is sent successfully or unsuccessfully, so that the SP server performs corresponding processing.

In a standard protocol oriented to the SP server, the telecommunication capability opening service provider oriented to the SP server and the caller must have the capability of a Web server, which requires the callee to be a Web server and open a callback interface so that the telecommunication capability opening server can call the interface when necessary. Because the SP server has the capability of the Web server, the callback can be achieved. However, for most free developers, it is difficult to become SPs. Therefore, in Web-based telecommunication capability oriented to free developers, a client (for example, a mobile phone) needs to interconnect with the telecommunication capability opening server directly. That is, the client needs to open Web services when running applications provided by the free developers, so that the telecommunication capability opening server can call the Web services when necessary.

However, in general, in Web-based telecommunication capability oriented to free developers, a client device is incapable of acting as a Web server, thus failing to achieve callback. As a result, the current Web-based telecommunication capability oriented to the SP server is not applicable to free developers directly.

SUMMARY

An embodiment of the present invention provides a method for callback processing in telecommunication capability opening to achieve callback in telecommunication capability opening oriented to free developers, so that Web-based telecommunication capability oriented to free developers is easily achieved. The method includes: receiving a telecommunication capability API call request sent by a client, where the telecommunication capability API call request includes a callback information parameter; performing call processing according to the telecommunication capability API call request, and generating a callback message according to the callback information parameter; and pushing the callback message to the client.

An embodiment of the present invention also provides a method for callback processing in telecommunication capability opening to achieve callback in telecommunication capability opening oriented to free developers, so that Web-based telecommunication capability oriented to free developers is easily achieved. The method includes: initiating a telecommunication capability API call request to a telecommunication capability opening server, where the telecommunication capability API call request includes a callback information parameter; receiving a callback message generated according to the callback information parameter and pushed by the telecommunication capability opening server, and parsing the callback message; and determining, according to a parsing result, a function that callback processing needs, and calling the function.

An embodiment of the present invention also provides a telecommunication capability opening server to achieve callback in telecommunication capability opening oriented to free developers, so that Web-based telecommunication capability oriented to free developers is easily achieved. The telecommunication capability opening server includes: a receiving module configured to receive a telecommunication capability API call request sent by a client, where the telecommunication capability API call request includes a callback information parameter; a calling module configured to perform call processing according to the telecommunication capability API call request; a callback message generating module configured to generate a callback message according to the callback information parameter; and a callback implementing module configured to push the callback message to the client.

An embodiment of the present invention also provides a client to achieve callback in telecommunication capability opening oriented to free developers, so that Web-based telecommunication capability oriented to free developers is easily achieved. The client includes: a call requesting module configured to initiate a telecommunication capability API call request to a telecommunication capability opening server, where the telecommunication capability API call request includes a callback information parameter; a receiving module configured to receive a callback message generated according to the callback information parameter and pushed by the telecommunication capability opening server; and a callback processing module configured to: parse the callback message; determine, according to a parsing result, a function that callback processing needs, and call the function.

An embodiment of the present invention also provides a telecommunication capability opening service system to achieve callback in telecommunication capability opening oriented to free developers, so that Web-based telecommunication capability oriented to free developers is easily achieved. The telecommunication capability opening service system includes: an application transaction platform server configured to provide a client with applications for the client to select and download, where the applications include a function of calling a telecommunication capability API; and a telecommunication capability opening server configured to: receive a telecommunication capability API call request that the client sends when the client runs the applications, where the telecommunication capability API call request includes a callback information parameter; perform call processing according to the telecommunication capability API call request, and generate a callback message according to the callback information parameter; and push the callback message to the client.

In embodiments of the present invention, a telecommunication capability API call request is received from the client, where the telecommunication capability API call request includes a callback information parameter; call processing is performed according to the telecommunication capability API call request, and a callback message is generated according to the callback information parameter; the callback message is pushed to the client. In this way, when the client does not have the capability of the Web server, callback is achieved by pushing the callback message, thereby helping to achieve Web-based telecommunication capability oriented to free developers.

In embodiments of the present invention, a telecommunication capability API call request is initiated to a telecommunication capability opening server, where the telecommunication capability API call request includes a callback information parameter; a callback message generated according to the callback information parameter and pushed by the telecommunication capability opening server is received, and the callback message is parsed; a function that callback processing needs is determined according to the parsing result, and the function is called. In this way, when the client does not have the capability of the Web server, callback is achieved by pushing the callback message, thereby helping to achieve Web-based telecommunication capability oriented to free developers.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some of the embodiments of the present invention, and persons of ordinary skill in the art may still derive other drawings from these accompanying drawings without creative efforts. In the drawings.

DETAILED DESCRIPTION

To make the objectives, technical solutions, and advantages of the embodiments of the present invention clearer, the following further describes the embodiments of the present invention in detail with reference to the accompanying drawings. The exemplary embodiments of the present invention and the description thereof are illustrative in nature, and shall not be construed as limitations on the present invention.

Callback in current telecommunication capability opening requires a caller of a telecommunication capability API to open Web services, so that a telecommunication capability opening server calls the Web services when the callback is needed. In Web-based telecommunication capability oriented to free developers, the telecommunication capability opening server is directly oriented to a client. Because the client, especially a mobile terminal on the mobile Internet, cannot process callback in a current standard form, in embodiments of the present invention, a protocol of the current callback form is considered to be converted into another protocol of an asynchronous callback form; after the protocol is converted into another protocol, original callback processing processes need to be modified to adapt to the new protocol. For mobile terminals or other clients with higher performance requirements, a feasible method is to convert a standard callback protocol into a "server push" protocol. In this form, the telecommunication capability opening server does not call services of the client directly, but pushes a callback message to the client; after parsing the callback message, the client determines which function should be called, and completes the call process.

Figure 1:
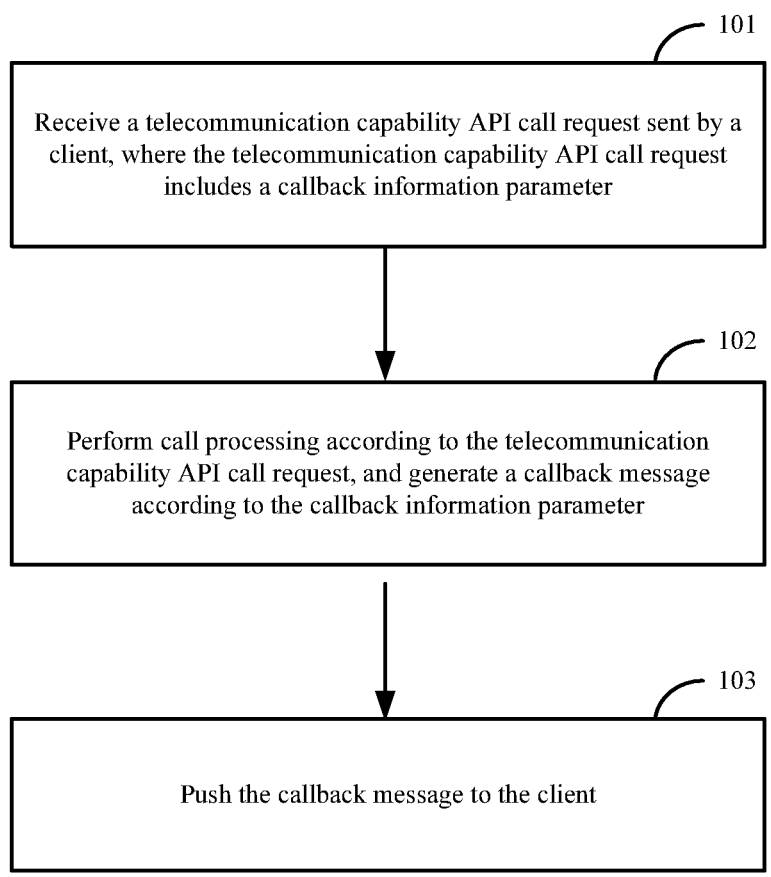
FIG. 1 is a flowchart of a method for callback processing in telecommunication capability opening according to an embodiment of the present invention.

As shown in FIG. 1, in an embodiment of the present invention, a process of a method for callback processing in telecommunication capability opening may include:

Step 101: Receive a telecommunication capability API call request sent by a client, where the telecommunication capability API call request includes a callback information parameter.

In the implementation, according to different services provided by callback processing, the callback information parameter may include different content. For example, for one type of application "widget" in a mobile phone, the callback information parameter may be an address of a callback function in the widget, where the address consists of four parts, namely, mobile phone number, widget identifier (ID), function name, and correlator (e.g., Tel:13632503792? widgetid=100&function=callbackfunction&Correlator=110).

This address indicates an application whose widget ID is equal to 100 in a mobile phone whose callback mobile phone number is 13632503792, where there is a function named "callbackfunction."

Step 102: Perform call processing according to the telecommunication capability API call request, and generate a callback message according to the callback information parameter.

The call processing is the same as that in the prior art. For example, if the client calls a short messaging API, the telecommunication capability opening server completes the short messaging function after parsing the request; if the client calls a telephony API, the telecommunication capability opening server dials the phone number of a peer party.

Still based on the assumption that the callback information parameter is the address of a callback function in the foregoing widget of the mobile phone, after finishing executing the request of the client, the telecommunication capability opening server finds and calls, through cooperation with the client, the function named "callbackfunction," and marks this call with "110" to differentiate multiple different calls of this function.

In addition, when calling the "callbackfunction" through cooperation with the client, the telecommunication capability opening server may transfer some parameters to this function to indicate service execution results. For example, in the case that the client calls the short messaging function of the telecommunication capability opening server, the telecommunication capability opening server may tell the "callbackfunction" whether the short message is sent successfully. The function of the "callbackfunction" may be as follows: If the short message is sent successfully, on the mobile phone interface, the user is prompted that the short message is already sent; if the short message fails to be sent, the short messaging service of the telecommunication capability opening server is called once again.

As mentioned above, the callback message has the following three functions: 1. finding a function of a client according to the "callback information parameter"; 2. telling the found function about a service result in the form of a parameter; 3. the function of the client executes different operations according to the service result.

Step 103: Push the callback message to the client.

According to the process shown in FIG. 1, in this embodiment of the present invention, a telecommunication capability API call request is received from a client, where the telecommunication capability API call request includes a callback information parameter; call processing is performed according to the telecommunication capability API call request, and a callback message is generated according to the callback information parameter; the callback message is pushed to the client. In this way, when the client does not have the capability of the Web server, callback is achieved by pushing the callback message, thereby helping to achieve Web-based telecommunication capability oriented to free developers.

The process shown in FIG. 1 may be implemented by an apparatus that can implement the function of the process, for example, the apparatus may be a telecommunication capability opening server. The following embodiments are based on the telecommunication capability opening server.

Figure 2:
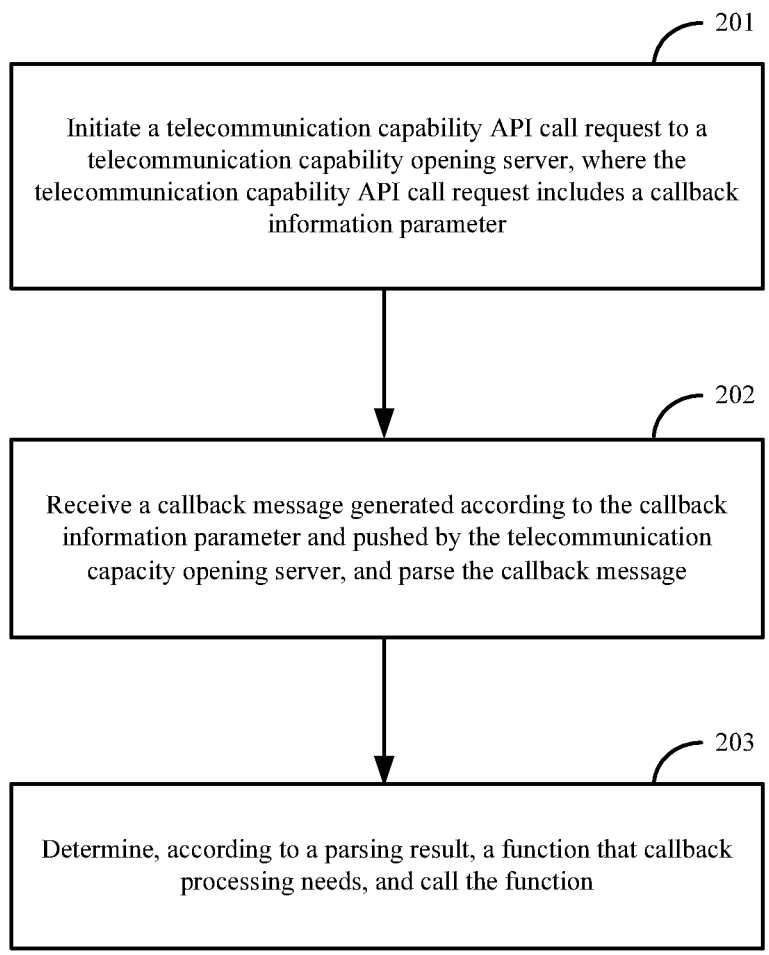
FIG. 2 is a flowchart of another method for callback processing in telecommunication capability opening according to an embodiment of the present invention.

As shown in FIG. 2, an embodiment of the present invention also provides a method for callback processing in telecommunication capability opening. The process may include:

Step 201: Initiate a telecommunication capability API call request to a telecommunication capability opening server, where the telecommunication capability API call request includes a callback information parameter.

Step 202: Receive a callback message generated according to the callback information parameter and pushed by the telecommunication capability opening server, and parse the callback message.

Step 203: Determine, according to a parsing result, a function that callback processing needs, and call the function.

According to the process shown in FIG. 2, in this embodiment of the present invention, a telecommunication capability API call request is initiated to a telecommunication capability opening server, where the telecommunication capability API call request includes a callback information parameter; a callback message generated according to the callback information parameter and pushed by the telecommunication capability opening server is received, and the callback message is parsed; a function that callback processing needs is determined according to the parsing result, and the function is called. In this way, when the client does not have the capability of the Web server, callback is achieved by pushing the callback message, thereby helping to achieve Web-based telecommunication capability oriented to free developers.

The process shown in FIG. 2 may be implemented by an apparatus that can implement the function of the process, for example, the apparatus may be a client. The following embodiments are based on the client. The client in embodiments of the present invention may be a mobile phone or other terminals and may also be an SP server.

In the specific implementation, the telecommunication capability API provided by a telecommunication capability opening server is universal and is irrelevant to specific services and client forms, while different clients such as an SP server, a personal computer (PC), and a mobile phone can accept different callback forms. Therefore, the telecommunication capability opening server needs to adapt to different clients. The adaptation process may include the following:

The telecommunication capability opening server provides the client with push modes, that is, the telecommunication capability opening server may open some optional push modes to the client for calling, where the push modes may be Ajax-based push, long-connection-based push, and streaming-pipe-based push. When the push mode is used in an SP server, whether the SP server opens Web services is not considered, and a callback method different from the traditional Web call is provided during the implementation.

The telecommunication capability opening server receives a registration request that the client initiates by selecting a push mode from the provided push modes, and registers, according to the registration request, the push mode selected by the client.

The client may register a push mode acceptable to the client. After receiving the push modes provided by the telecommunication capability opening server, the client selects a push mode from these push modes to initiate a registration request to the telecommunication capability opening server. When the telecommunication capability opening server pushes a callback message to the client, it may push the callback message to the client according to the push mode registered by the client; the client receives the callback message that the telecommunication capability opening server pushes according to the registered push mode.

Specifically, pushing the callback message to the client by the telecommunication capability opening server according to the push mode registered by the client may be as follows: The telecommunication capability opening server decides, according to the push mode registered by the client, which push mode is used. In addition, in different push modes, the telecommunication capability opening server generates different callback messages. The "push mode" may be applicable to a mobile phone or other terminals and may also be applicable to an SP server; when the push mode is used in the SP server, whether the SP server opens Web services is not considered, and a callback method different from the traditional Web call is provided during the implementation. Certainly, during the specific implementation, the telecommunication capability opening server may provide the client with optional Web-based callback modes in addition to the optional push modes. At this time, the "push mode" may be used in a mobile phone or other terminals only; if the client is an SP server, the implementation may be based on a Web call mode.

For the callback in the form of "server push" in embodiments of the present invention, "server push" communication pipes may be created and maintained between the client and the telecommunication capability opening server to push callback messages. When the telecommunication capability opening server pushes a callback message to the client, it may select a corresponding communication pipe from the "server push" communication pipes maintained and managed by the telecommunication capability opening server, and pushes the callback message to the client.

The "server push" communication pipes created and maintained between the client and the telecommunication capability opening server may adopt the form of a long connection because push modes based on the long connection may achieve higher communication performance.

The client (generally a browser) in traditional Web technologies works based on the "pull" mode, that is, when the client clicks the "Open" or "Refresh" button, the client pulls related information from the server. When the client does not click the "Open" or "Refresh" button, the server and the client cannot exchange information. Such technologies as Ajax and HTTP long connection facilitate the implementation of "server push" in embodiments of the present invention. Before the telecommunication capability opening server pushes the callback message, for example, when the client is started or at any other moment before the telecommunication capability opening server may push the callback message, the client may negotiate with the telecommunication capability opening server to set up a long connection for pushing the callback message. Specifically, the client may initiate a long connection request to set up a communication connection reserved for a long time between the client and the telecommunication capability opening server. At any time before the long connection expires, the telecommunication capability opening server may push the callback message through the long connection.

The long connection may be used as the "server push" technology and be directly used in the Web-based telecommunication capability oriented to free developers in embodiments of the present invention. During the specific implementation, the following method may also be used to improve the performance of the long connection to better adapt to the client on the mobile Internet.

If the long connection technology is directly used to implement the "server push" function, each application and even each page in an application need to maintain a long connection with the telecommunication capability opening server. In the current architecture, different applications are implemented by different SP providers, that is, one client application corresponds to one SP server. Therefore, different applications need to set up a long connection with respective SP servers. Generally, one client runs multiple applications at the same time, and one application has multiple pages. Therefore, if the long connection technology is directly used, the client is likely to maintain multiple long connections with the server. Too many long connections may consume a lot of client resources, bringing about a large impact on the client.

Therefore, in an embodiment, considering that a universal telecommunication capability opening server may be used in embodiments of the present invention to replace each traditional SP server and that all applications can interconnect with a same telecommunication capability opening server through a same client, multiple applications may share a long connection. That is, long connections are managed by using a "centralized" mode. The client negotiates, through the running environment of applications, with the telecommunication capability opening server to set up a long connection, where the long connection is used by the telecommunication capability opening server to push callback messages of different applications and/or different pages, that is, the telecommunication capability opening server pushes the callback messages of different applications and different pages to a same client through the long connection. In this way, the number of long connections that need to be maintained between the client and the telecommunication capability opening server is greatly reduced, thereby effectively saving client resources. After receiving the callback messages pushed by the telecommunication capability opening server, the client parses the callback messages according to the protocol, determines, according to the parsing results, which function should be called, and completes the call process.

Figure 3:
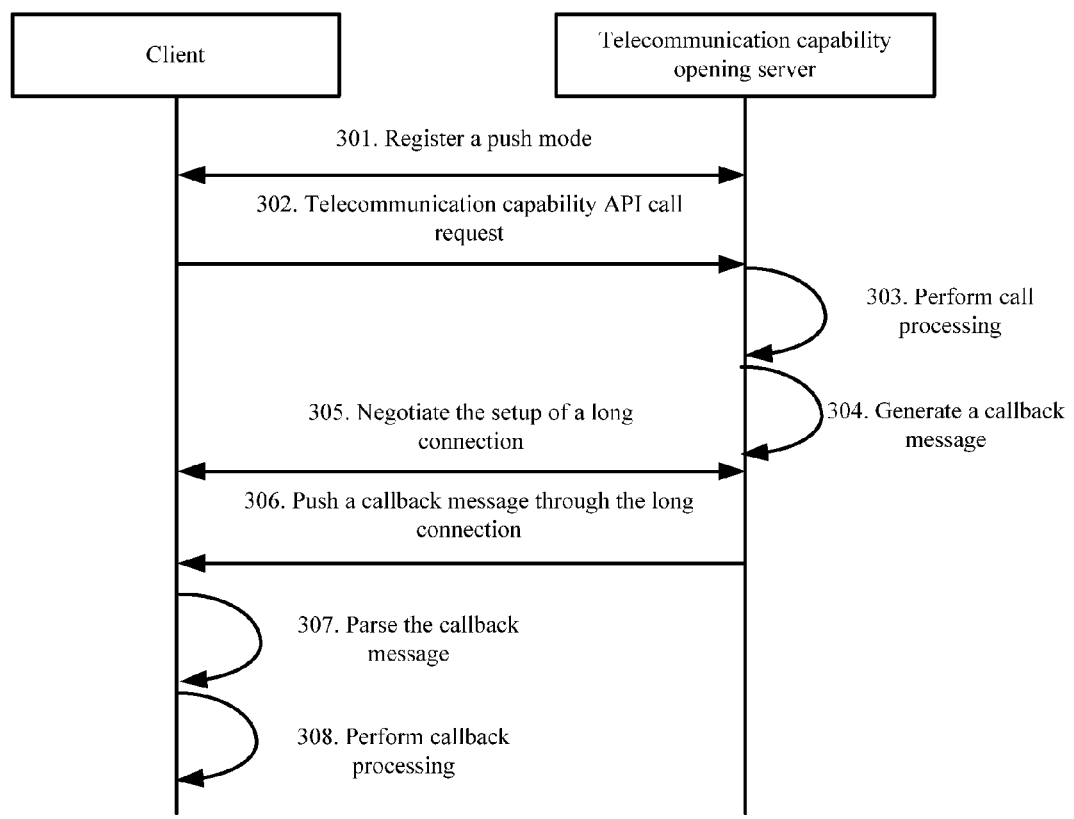
FIG. 3 is a flowchart of a specific instance of a method for callback processing in telecommunication capability opening according to an embodiment of the present invention.

The following describes, by using an example, a method for callback processing in telecommunication capability opening according to an embodiment of the present invention. As shown in FIG. 3, the process may include:

Step 301: A client completes a process of registering a push mode with a telecommunication capability opening server. Specifically, the process may include: the telecommunication capability opening server provides the client with push modes for selection; the client selects a push mode from these push modes to initiate a registration request to the telecommunication capability opening server; the telecommunication capability opening server registers, according to the registration request, the push mode selected by the client.

Step 302: The client initiates a telecommunication capability API call request to the telecommunication capability opening server, where the telecommunication capability API call request includes a callback information parameter.

Step 303: After receiving the telecommunication capability API call request, the telecommunication capability opening server performs call processing according to the telecommunication capability API call request. Specifically, the process may include: parsing the telecommunication capability API call request, and completing the call service according to the parsing result.

Step 304: The telecommunication capability opening server generates a callback message according to the callback information parameter.

Step 305: The telecommunication capability opening server negotiates with the client to set up a long connection for pushing the callback message. Specifically, the long connection may be a long connection for pushing callback messages of different applications and/or different pages to the client. This step is executed before step 306.

Step 306: The telecommunication capability opening server pushes the callback message to the client through the long connection.

Step 307: After receiving the callback message pushed by the telecommunication capability opening server, the client parses the callback message.

Step 308: The client determines, according to the parsing result, a function that callback processing needs, and calls the function to complete the callback processing.

Based on the same inventive idea, embodiments of the present invention also provide a telecommunication capability opening server and a client, as described in the following embodiments. The problem-solving principles of the telecommunication capability opening server and the client are similar to the method for callback processing in telecommunication capability opening. Therefore, for details about the implementation of the telecommunication capability opening server and the client, refer to the implementation of the method, which is not further described herein.

Figure 4:
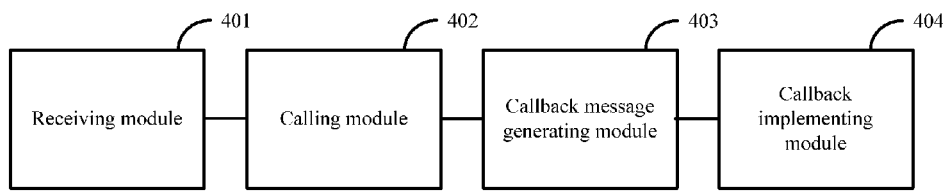
FIG. 4 is a schematic structural diagram of a telecommunication capability opening server according to an embodiment of the present invention.

As shown in FIG. 4, a telecommunication capability opening server provided in an embodiment of the present invention may include: a receiving module 401 configured to receive a telecommunication capability API call request sent by a client, where the telecommunication capability API call request includes a callback information parameter; a calling module 402 configured to perform call processing according to the telecommunication capability API call request; a callback message generating module 403 configured to generate a callback message according to the callback information parameter; and a callback implementing module 404 configured to push the callback message to the client.

Figure 5:
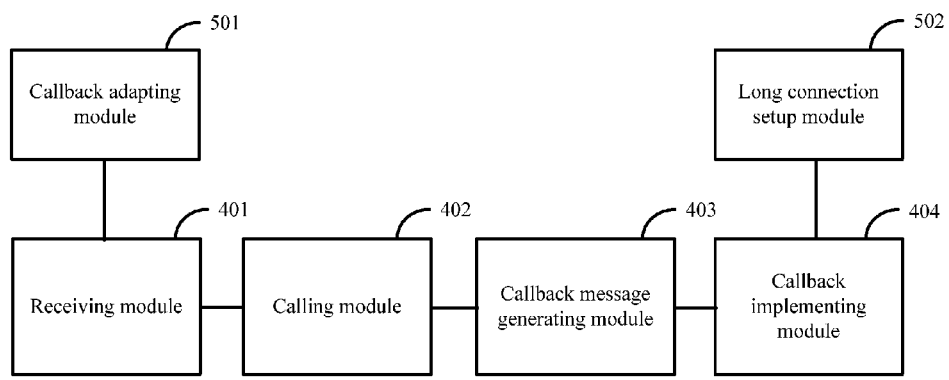
FIG. 5 is a schematic structural diagram of a specific instance of a telecommunication capability opening server according to an embodiment of the present invention.

As shown in FIG. 5, in an embodiment, the telecommunication capability opening server shown in FIG. 4 may further include: a callback adapting module 501 configured to provide the client with push modes; where the receiving module 401 is further configured to receive a registration request that the client initiates by selecting a push mode from the provided push modes; the callback adapting module 501 is further configured to register, according to the registration request, the push mode selected by the client; and the callback implementing module 404 is specifically configured to push the callback message to the client according to the registered push mode.

As shown in FIG. 5, in an embodiment, the telecommunication capability opening server shown in FIG. 4 may further include: a long connection setup module 502 configured to: before the callback implementing module 404 pushes the callback message to the client, negotiate with the client to set up a long connection for pushing callback message; where the callback implementing module 404 is specifically configured to push the callback message to the client through the long connection.

In an embodiment, the long connection setup module 502 may be specifically configured to: negotiate with the client to set up a long connection, where the long connection is used to push callback messages of different applications and/or different pages to the client.

Figure 6:
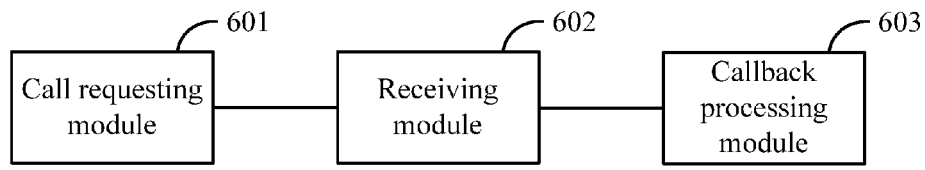
FIG. 6 is a schematic structural diagram of a client according to an embodiment of the present invention.

As shown in FIG. 6, a client provided in an embodiment of the present invention may include: a call requesting module 601 configured to initiate a telecommunication capability API call request to a telecommunication capability opening server, where the telecommunication capability API call request includes a callback information parameter; a receiving module 602 configured to receive a callback message generated according to the callback information parameter and pushed by the telecommunication capability opening server; and a callback processing module 603 configured to: parse the callback message; determine, according to a parsing result, a function that callback processing needs, and call the function.

In an embodiment, the receiving module 602 may be further configured to receive push modes provided by the telecommunication capability opening server.

Figure 7:
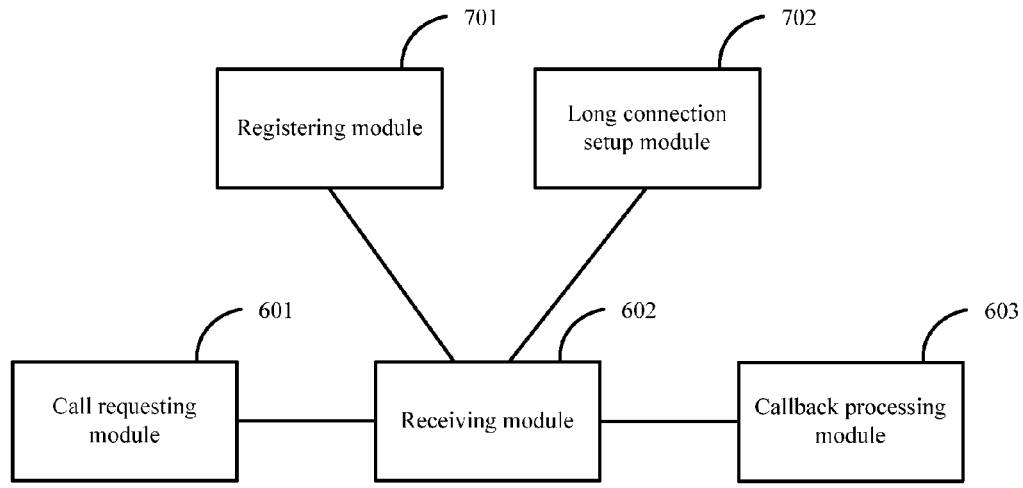
FIG. 7 is a schematic structural diagram of a specific instance of a client according to an embodiment of the present invention.

As shown in FIG. 7, the client shown in FIG. 6 may further include: a registering module 701 configured to select a push mode from the push modes provided by the telecommunication capability opening server to initiate a registration request to the telecommunication capability opening server; where the receiving module 602 is specifically configured to receive a callback message that the telecommunication capability opening server pushes according to the registered push mode.

As shown in FIG. 7, in an embodiment, the client shown in FIG. 6 may further include: a long connection setup module 702 configured to: before the receiving module 602 receives the callback message pushed by the telecommunication capability opening server, negotiate with the telecommunication capability opening server to set up a long connection for pushing the callback message; where the receiving module 602 is specifically configured to receive a callback message that the telecommunication capability opening server pushes through the long connection.

In an embodiment, the long connection setup module 702 may be specifically configured to negotiate with the telecommunication capability opening server to set up a long connection, where the long connection is used to receive callback messages of different applications and/or different pages pushed by the telecommunication capability opening server.

Based on the same inventive idea, an embodiment of the present invention also provides a telecommunication capability opening service system, as described in the following embodiment. The problem-solving principles of the telecommunication capability opening service system are similar to the method for callback processing in telecommunication capability opening. Therefore, for details about the implementation of the telecommunication capability opening service system, refer to the implementation of the method, which is not further described herein.

Figure 8:
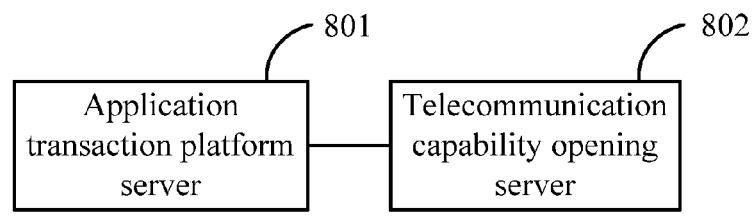
FIG. 8 is a schematic structural diagram of a telecommunication capability opening service system according to an embodiment of the present invention.

As shown in FIG. 8, a telecommunication capability opening service system provided in an embodiment of the present invention may include: an application transaction platform server 801 configured to provide a client with applications for the client to select and download, where the applications include a function of calling a telecommunication capability API; and a telecommunication capability opening server 802 configured to: receive a telecommunication capability API call request that the client sends when the client runs the applications, where the telecommunication capability API call request includes a callback information parameter; perform call processing according to the telecommunication capability API call request, and generate a callback message according to the callback information parameter; and push the callback message to the client.

Figure 9:
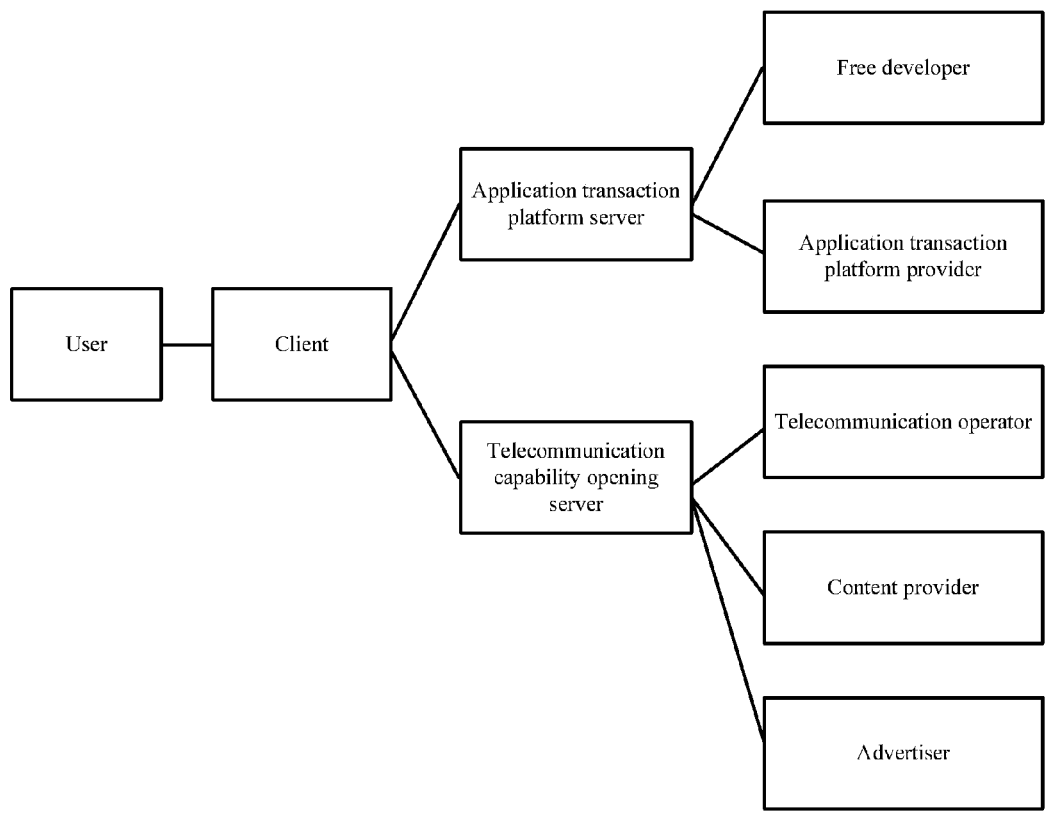
FIG. 9 is a schematic diagram illustrating a specific implementation of a telecommunication capability opening service system according to an embodiment of the present invention.

FIG. 9 is a schematic diagram illustrating a specific implementation of the telecommunication capability opening service system. As shown in FIG. 9, the application transaction platform server can help free developers complete processes of developing and releasing applications. The free developers develop applications, and upload the applications to the application transaction platform server. The client of a user may select and download the applications on the application transaction platform server. The application transaction platform server may also provide some functions to help the free developers and users complete an online transaction process. After a user downloads an application, the free developers complete the processes of developing and releasing the application.

The telecommunication capability opening server supports applications developed by all free developers, and the telecommunication capability API opened by the telecommunication capability opening server has universality. The free developers do not participate in the operation process and do not provide an auxiliary SP server for their developed applications to provide capability of the Web server for callback processing. That is, after the client of the user downloads the applications, by pushing callback messages by the telecommunication capability opening server, the client and the telecommunication capability opening server can directly form a telecommunication operation network to complete the operation of services related to the applications, and the client can directly process the callback messages pushed by the telecommunication capability opening server to complete the callback process.

The foregoing telecommunication capability opening service system adopts an architecture where the development and release of telecommunication services are separated from the operation of telecommunication services. In this architecture, developing and releasing of applications by the free developers are implemented on the application transaction platform server, and the telecommunication capability opening server implements the opening and operation of telecommunication capability oriented to the client. The two servers are used together to complete the lifecycles of telecommunication services on the mobile Internet, thereby implementing a telecommunication capability opening service system that can completely cover requirements of the mobile Internet.

In conclusion, in embodiments of the present invention, a telecommunication capability API call request sent by a client is received, where the telecommunication capability API call request includes a callback information parameter; call processing is performed according to the telecommunication capability API call request, and a callback message is generated according to the callback information parameter; the callback message is pushed to the client. In this way, when the client does not have the capability of the Web server, callback is achieved by pushing the callback message, thereby helping to achieve Web-based telecommunication capability oriented to free developers.

In embodiments of the present invention, a telecommunication capability API call request is initiated to a telecommunication capability opening server, where the telecommunication capability API call request includes a callback information parameter; a callback message pushed by the telecommunication capability opening server is received, and the callback message is parsed; a function that callback processing needs is determined according to a parsing result, and the function is called. In this way, when the client does not have the capability of the Web server, callback is achieved by pushing the callback message, thereby helping to achieve Web-based telecommunication capability oriented to free developers.

An embodiment of the present invention also provides a telecommunication capability opening service system oriented to free developers. The system adopts an architecture where the development and release of telecommunication services are separated from the operation of telecommunication services. In this architecture, an application transaction platform server implements development and release of applications and a telecommunication capability opening server implements the operation of telecommunication services. In this way, the barrier to telecommunication service development is lowered, so that free developers who are unable to participate in the telecommunication operation can also participate in the development of telecommunication services.

It is understandable by persons skilled in the art that embodiments of the present invention may be provided as methods, systems, or computer programs. Therefore, the present invention may adopt forms of complete hardware embodiments, complete software embodiments, or embodiments combining software and hardware. Furthermore, the present invention may adopt forms of computer program products implemented in one or multiple computer available storage media (including but not limited to disk memories, compact disc read-only memories (CD-ROMs), optical memories) including computer available program codes.

The present invention is described according to flowcharts and/or block diagrams of methods, devices (e.g., systems), and computer program products provided in embodiments of the present invention. It is understandable that computer program instructions may be used to execute each process and/or block in the flowcharts and/or block diagrams or combinations of processes and/or blocks in the flowcharts and/or block diagrams. Such computer program instructions may be provided to processors in universal computers, dedicated computers, embedded processors, or other programmable data processing devices to generate a machine, so that the instructions executed by the processors in the computers or other programmable data processing devices generate an apparatus configured to implement specified functions in one process or multiple processes in the flowcharts and/or one block or multiple blocks in the block diagrams.

Such computer program instructions may also be stored in computer readable memories that can boot the computers or other programmable data processing devices to work in a particular mode, so that the instructions stored in the computer readable memories generate manufactured products including an instructing apparatus, where the instructing apparatus implements specified functions in one process or multiple processes in the flowcharts and/or one block or multiple blocks in the block diagrams.

Such computer program instructions may also be loaded to computers or other programmable data processing devices, so that a series of operation steps are executed in the computers or other programmable devices to generate processes implemented by the computers, so that instructions executed in the computers or other programmable data processing devices provide steps used to implement specified functions in one or multiple processes in the flowcharts and/or one block or multiple blocks in the block diagrams.

The foregoing specific embodiments further describe the objectives, technical solutions and benefits of the present invention in detail. It is understandable that the foregoing descriptions are merely specific embodiments of the present invention, but are not intended to limit the protection scope of the present invention. Any modification, equivalent replacement, or improvement made within the principle of the present invention should all fall within the protection scope of the present invention.

What is claimed is:

1. A method for callback processing in telecommunication capability opening, comprising:
    receiving, by a telecommunication capability opening server, a telecommunication capability application programming interface (API) call request sent by a client, wherein the telecommunication capability API call request comprises a callback information parameter, wherein the callback information parameter is an address of a callback function of a widget, and wherein the address of the callback function of the widget comprises a mobile phone number, a widget identifier, and a correlator;
    performing, by the telecommunication capability opening server, call processing according to the telecommunication capability API call request;
    generating, by the telecommunication capability opening server, a callback message according to the callback information parameter;
    negotiating, by the telecommunication capability opening server, with the client to set up a long connection for pushing the callback message; and
    pushing, by the telecommunication capability opening server, the callback message to the client through the long connection,
    wherein the long connection is configured to push callback messages of different applications and/or different pages to the client.

2. The method according to claim 1, further comprising:
    providing, by the telecommunication capability opening server, the client with push modes;
    receiving, by the telecommunication capability opening server, a registration request that the client initiates by selecting a push mode from the provided push modes; and
    registering, by the telecommunication capability opening sever, the push mode selected by the client according to the registration request,
    wherein pushing the callback message to the client comprises pushing the callback message to the client according to the registered push mode.

3. A method for callback processing in telecommunication capability opening, comprising:
    initiating, by a client device, a telecommunication capability Application Programming Interface (API) call request to a telecommunication capability opening server, wherein the telecommunication capability API call request comprises a callback information parameter, wherein the callback information parameter is an address of a callback function of a widget, and wherein the address of the callback function of the widget comprises a mobile phone number, a widget identifier, and a correlator;
    negotiating, by the client device, with the telecommunication capability opening server to set up a long connection for pushing the callback message;
    receiving, by the client device, a callback message generated according to the callback information parameter and pushed by the telecommunication capability opening server through the long connection;
    parsing, by the client device, the callback message;
    determining, by the client device a function that callback processing needs according to a parsing result; and
    calling, by the client device, the function,
    wherein the long connection is configured to push callback messages of different applications and/or different pages to the client.

4. The method according to claim 3, further comprising:
    receiving, by the client device, push modes provided by the telecommunication capability opening server;
    selecting, by the client device, a push mode from the provided push modes to initiate a registration request to the telecommunication capability opening server, and
    wherein receiving the callback message pushed by the telecommunication capability opening server comprises receiving the callback message that the telecommunication capability opening server pushes according to the registered push mode.

5. A telecommunication capability opening server, comprising:
    a processor configured to:
    receive a telecommunication capability Application Programming Interface (API) call request sent by a client, wherein the telecommunication capability API call request comprises a callback information parameter, wherein the callback information parameter is an address of a callback function of a widget, and wherein the address of the callback function of the widget comprises a mobile phone number, a widget identifier, and a correlator;
        perform call processing according to the telecommunication capability API call request;
        generate a callback message according to the callback information parameter;
        negotiate with the client to set up a long connection for pushing the callback message; and
        push the callback message to the client,
        wherein the long connection is used to push callback messages of different applications and/or different pages to the client.

6. The telecommunication capability opening server according to claim 5, wherein the processor is further configured to:
    provide the client with push modes;
    receive a registration request that the client initiates by selecting a push mode from the provided push modes;
    register, according to the registration request, the push mode selected by the client; and
    push the callback message to the client according to the registered push mode.

7. A client, comprising:
    a processor configured to:
        initiate a telecommunication capability Application Programming Interface (API) call request to a telecommunication capability opening server, wherein the telecommunication capability API call request comprises a callback information parameter, wherein the callback information parameter is an address of a callback function of a widget, and wherein the address of the callback function of the widget comprises a mobile phone number, a widget identifier, and a correlator;

negotiate with the telecommunication capability opening server to set up a long connection for pushing the callback message;

receive a callback message generated according to the callback information parameter and pushed by the telecommunication capability opening server through the long connection;

parse the callback message;

determine a function that the callback processing needs according to a parsing result; and call the function, wherein the long connection is configured to push callback messages of different applications and/or different pages to the client.

8. The client according to claim 7, wherein the processor is further configured to:

receive push modes provided by the telecommunication capability opening server;

select a push mode from the provided push modes to initiate a registration request to the telecommunication capability opening server; and receive the callback message that the telecommunication capability opening server pushes according to the registered push mode.

9. The method according to claim 1, further comprising parsing the telecommunication capability API call request and completing a call service according to a result of the parsing.

10. The method according to claim 3, wherein the client parses the callback message according to a predetermined protocol.

11. The telecommunication capability opening server according to claim 5, wherein the processor is further configured to parse the telecommunication capability API call request and complete a call service according to a result of the parsing.

12. The client according to claim 7, wherein the processor is further configured to parse the callback message according to a predetermined protocol.

13. The method according to claim 1, wherein the mobile phone number comprises a sequence of digits associated with the client, wherein the widget identifier comprises a sequence of digits associated with the widget, and wherein the correlator comprises a sequence of digits to distinguish multiple different calls of the callback function.

14. The method according to claim 3, wherein the mobile phone number comprises a sequence of digits associated with the client, wherein the widget identifier comprises a sequence of digits associated with the widget, and wherein the correlator comprises a sequence of digits to distinguish multiple different calls of the callback function.

15. The telecommunication capability opening server according to claim 5, wherein the mobile phone number comprises a sequence of digits associated with the client, wherein the widget identifier comprises a sequence of digits associated with the widget, and wherein the correlator comprises a sequence of digits to distinguish multiple different calls of the callback function.

16. The client according to claim 7, wherein the mobile phone number comprises a sequence of digits associated with the client, wherein the widget identifier comprises a sequence of digits associated with the widget, and wherein the correlator comprises a sequence of digits to distinguish multiple different calls of the callback function.

* * * * *

UNITED STATES PATENT AND TRADEMARK OFFICE
CERTIFICATE OF CORRECTION

| | |
|---|---|
| PATENT NO. | : 8,848,893 B2 |
| APPLICATION NO. | : 13/870673 |
| DATED | : September 30, 2014 |
| INVENTOR(S) | : Zhihong Qiu et al. |

Page 1 of 1

It is certified that error appears in the above-identified patent and that said Letters Patent is hereby corrected as shown below:

In the Claims

Column 13 Line 55, Claim 2 should read:

The method according to claim 1, further comprising:
  providing, by the telecommunication capability opening server, the client with push modes;
  receiving, by the telecommunication capability opening server, a registration request that the client initiates by selecting a push mode from the provided push modes; and
  registering, by the telecommunication capability opening server, the push mode selected by the client according to the registration request,
  wherein pushing the callback message to the client comprises pushing the callback message to the client according to the registered push mode.

Signed and Sealed this
Second Day of June, 2015

Michelle K. Lee
*Director of the United States Patent and Trademark Office*